United States Patent [19]
Willard

[11] Patent Number: 4,946,806
[45] Date of Patent: Aug. 7, 1990

[54] FLAME SPRAYING METHOD AND COMPOSITION

[75] Inventor: David C. Willard, Freeport, The Bahamas

[73] Assignee: Sudamet, Ltd., Freeport, The Bahamas

[21] Appl. No.: 272,082

[22] Filed: Nov. 16, 1988

Related U.S. Application Data

[63] Continuation-in-part of Ser. No. 255,634, Oct. 11, 1988.

[51] Int. Cl.[5] ........................ C04B 35/56; C04B 35/4; C04B 35/10

[52] U.S. Cl. ........................ 501/88; 501/108; 501/117; 501/118

[58] Field of Search ........................ 501/88, 4, 9, 55, 67, 501/118, 121, 122, 132, 133, 128, 104, 154, 72, 76; 427/199, 344, 423

[56] References Cited

U.S. PATENT DOCUMENTS

| | | | |
|---|---|---|---|
| 2,108,998 | 2/1938 | Schori . | |
| 2,904,449 | 9/1959 | Bradstreet | 501/111 |
| 2,943,951 | 7/1960 | Haglund et al. | 427/190 |
| 3,415,450 | 12/1968 | Hawk . | |
| 4,192,460 | 3/1980 | Matsuo . | |
| 4,411,935 | 10/1983 | Anderson . | |
| 4,487,397 | 12/1984 | Antonov et al. . | |
| 4,489,022 | 12/1984 | Robyn et al. | 264/30 |
| 4,546,902 | 10/1985 | Anderson . | |
| 4,588,655 | 5/1986 | Kushner . | |
| 4,593,007 | 6/1986 | Novinski . | |
| 4,634,611 | 1/1987 | Browning . | |
| 4,792,468 | 12/1988 | Robyn et al. . | |
| 4,818,574 | 4/1989 | Mottet et al. . | |
| 4,865,252 | 9/1989 | Rotolico et al. . | |

FOREIGN PATENT DOCUMENTS

| | | |
|---|---|---|
| 1106430 | 5/1986 | Japan . |
| 2046954 | 2/1987 | Japan . |
| 1255610 | 7/1986 | U.S.S.R. . |
| 991046 | 5/1965 | United Kingdom . |
| 1151423 | 5/1969 | United Kingdom . |
| 1330895 | 9/1973 | United Kingdom . |

*Primary Examiner*—Mark L. Bell
*Assistant Examiner*—Sue Hollenbeck
*Attorney, Agent, or Firm*—Watts, Hoffmann, Fisher & Heinke Co.

[57] ABSTRACT

Oxidizable metallic particles having a grain size of 60 microns or less of the combination of zinc and magnesium used as heat sources in the flame spraying of refractory masses wherein the zinc magnesium form 5% or less by weight of the total mixture of oxidizable particles and refractory particles, and are used with oxidizable metallic silicon in an amount between 8 and 20% by weight, wherein one or more of silica, alumina, magnesite, chromia and/or zirconia, or silicon carbide form the incombustible refractory particles.

10 Claims, No Drawings

FLAME SPRAYING METHOD AND COMPOSITION

RELATED APPLICATIONS

This is a continuation in part of U.S. Application Ser. No. 07/255,634, filed October 11, 1988.

BACKGROUND OF THE INVENTION

1. Technical Field

The invention relates to the repair of worn or damaged refractory linings and more particularly to a flame spraying method and composition utilizing zinc and/or magnesium oxidizable particles for use with flame spraying apparatus for the in situ repair of the linings.

2. Description of the Related Art

Coke ovens, glass furnaces, soaking pots, reheat furnaces, ladles and the like are lined with refractory brick or castings. These linings become eroded or damaged due to the stresses resulting from high temperature service.

Ideally, repairs to these linings are effected in situ while the ovens or furnaces are hot so as to eliminate cool down and heat up periods during which the ovens or furnaces are not in service.

Currently, a common method of repairing these refractory linings is to spray coat the damaged area with powdered refractory slurried with water for application. Such coatings have inherent drawbacks in that the moisture in the slurry can thermally shock the refractory area being repaired by excessive local cooling that causes spalling of the surface. In addition, the bond mechanism and the resulting wear characteristic and adherence are relatively poor so that the repair itself require frequent repairs. Such repairs are commonly done on a daily to monthly basis, depending on the type of lining being repaired and its service. For example, spray coatings on coke ovens may last only one to four weeks, and usually last less than one or two months.

Another well known technique of repairing damaged linings in situ is flame spraying the damaged area to . deposit a refractory material. In flame spraying, refractory particles and oxidizable particles are sprayed from a lance toward the damaged lining. The oxidizable particles are combusted to cause the refractory particles, or at least the surface thereof, to be molten or sintered.

U.S. Pat. Nos. 3,741,822 and 3,684,560, Swedish Patent No. 102,083, and British Patent No. GB2035524B all disclose the use of powdered metals as the oxidizable particle heat sources in the formation of shaped refractory masses. These patents teach refractory masses formed by burning highly combustible metal powders such as aluminum, silicon, and/or a magnesium in the presence of refractory oxides such as silica, alumina and/or magnesite, and oxygen as a combustion supporting gas. These processes use finely divided metal powders having a grain use size below about 50 to 100 microns. The rapid heat generated by burning the very fine particles tends to liquify or soften the entrained refractory particles as well as to soften the area being repaired.

U.S. Pat. No. 4,488,022 teaches the use of finely divided metal powders having grain size less than about 50 microns. The metal powders are a mixture of silicon and aluminum.

U.S. Patent Application Ser. No. 07/255,634, the disclosure of which is incorporated by reference, teaches the use of powdered oxidizable metal particles of chromium, aluminum or magnesium. Typically, the oxidizable metal heat sources have been chosen to be complementary to the sprayed refractory oxides and the refractories in the lining undergoing repair. Swedish Patent No. 102,083, for instance, teaches that when roasted cyanite ($3AL_2O_3.2SiO_2$) or sillimanite ($AL_2O_3.SiO_2$) are used as the refractory oxides in a flame spraying repair of linings, aluminum and silicon should be used at the same time in such proportions as correspond to the proportion in the oxides.

The art, however, has counseled against employing zinc metal as an oxidizable metal powder heat source in the repair of coke ovens and the like because metallic zinc is considered an undesirable contaminant in the ferrous metal products of the steel making and foundry industries.

Although magnesium has been suggested as a suitable heat source because metallic magnesium is not considered a contaminant, in practice, magnesium has not been employed because it is extremely reactive and tends towards hazardous back flashes when used as a heat source in flame spraying apparatuses.

SUMMARY OF THE INVENTION

The invention provides for the use of zinc metal powder or magnesium metal powder or a mixture of the two as a heat sources in the formation of refractory masses through flame spraying.

According to this invention an adherent, coherent refractory mass can be formed by using at least one of the finely divided particles of zinc and/or magnesium, combined with other combustible metal particles and refractory oxide grains during spraying in a stream of oxygen against a surface to be repaired.

It has been found that the use of zinc metal powder or magnesium metal powder or a mixture of both in an amount of 5% or less by weight of the total mixture, when used in conjunction with silicon metal in amounts between 8 and 20% by weight of the total mixture as the heat source or combustible portion of the mixture, in which one or more of silica, alumina, magnesite, chromia, and/or zirconia form the incombustible refractory material is particularly advantageous with respect to the technical aspects of the reaction, the amount of "rebound", the resulting formed mass, and the economic aspects of the process.

The metal powder heat source should preferably be of a size effective for combustion in a flame spraying apparatus. −325 X D USS mesh grading has been found to be satisfactory.

The percentage by weight of metallic silicon and zinc and/or magnesium varies depending on the melting point of the incombustible refractory powders. For example, the use of 16 to 18% by weight of silicon metal powder −325 x D USS mesh grading, together with 0.5 to 3% of zinc metal powder −325×D USS mesh grading produces a high quality coherent, adherent refractory mass when mixed with crushed silica refractory powder −12×D USS. Similarly a high quality refractory mass can be produced effectively with 16 to 18% silicon metal powder, $\frac{1}{4}$ to $\frac{1}{2}$% magnesium and $\frac{1}{4}$ to $\frac{1}{2}$% zinc.

These are particularly advantageous mixtures to use when repairing silica brick in glass tanks or coke ovens since any residual metal remaining unburnt in the heat of reaction will transfer to its oxide allowing silica mixtures of ultra high purity to be formed.

In the formation of zirconia/silica mixtures for the repair of glass tank high wear refractories, for example, the preferred percentage of silicon 20 to 25% together with 1 to 4% zinc metal powder, and/or 0.5 to 2% magnesium metal powder. As the percentage of zirconia in the non-combustible portion of the mixture is increased and the percentage of silica reduced the percentages of silicon and/or magnesium are increased.

These mixtures have the particular characteristics of being able to be formulated to a very close likeness to the refractory analysis being repaired, hence matching the thermal coefficient of expansion and minimizing shearing occurring along the repair interface when the refractories are heated or cooled.

Another particularly advantageous refractory coherent, adherent mass which can be formed using these materials is one where the incombustible portion of the mixture is silicon carbide and the combustible heat sources are silicon metal powder and zinc and magnesium metal powders. The ideal mesh grading is −325 to dust USS mesh grading or an average size up to 50 microns for the metal powder portion of the mixture. Good results have been produced using silicon carbide powder which has a mesh grading of −200× D USS mesh as the incombustible refractory filler.

Accordingly, the invention provides a composition for flame spraying refractory linings in situ comprising a mixture of oxidizable metallic particles and incombustible refractory wherein the .metallic particles are silicon, and zinc or magnesium or a combination of zinc and magnesium, and wherein the incombustible refractory particles comprise silica, alumina, magnesite, chromia and/or zirconia, or silicon carbide.

The oxidizable particles may have a grain size of 60 microns or less and preferably 20 microns or less. The zinc or magnesium or the combination of the two may be present in an amount up about 6% by weight of the total mixture; the silicon may be present in an amount of between about 8 and about 25% by weight.

When the incombustible refractory particles comprise silica, alumina, magnesite, chromia and/or zirconia, the zinc may be present in an amount from about 0.25% to about 3% by weight or the magnesium may be present in an amount from about 0.25% to about 2% by weight, or a combination of zinc and magnesium forming up to about 5% of the weight of the mixture may be used. In this case, the silicon may be present in an amount from about 12% to about 25% by weight. Preferably, the zinc is present in an amount from about 0.25% to about 1% by weight, the magnesium is present in an amount from about 0.25% to about 0.5% by weight, and wherein the silicon is present in an amount from about 12% to about 18% weight.

When the incombustible refractory particles comprise silicon carbide, the zinc may be present in an amount from about 1% to about 3% by weight, the magnesium may be present in an amount from about 1% to about 3% by weight, and the silicon may be present in an amount from about 14 % to about 20% by weight. Preferably, the zinc is present in an amount of about 2% by weight, the magnesium is present in an amount of about 2% by weight, and the silicon is present in an amount of about 20% by weight.

Additionally, the invention provides methods wherein compositions as described above are flame sprayed by being projected while burning toward a surface to be repaired in situ. The rate of deposition of the particles is less than 10 pounds per minute, and preferably around 1 to 2 pounds per minute. These deposition rates can be achieved using a flame spraying lance of conventional design having an outlet nozzle of appropriate size, that is, in the neighborhood of $\frac{3}{4}$ to 1 inch in diameter.

While not wishing to be bound by theory, the slower or lower deposition rates combined with an upper limit of 6% by weight magnesium and/or zinc, appear to contribute to the usability of highly reactive magnesium without serious backflashing.

The advantage of being able to employ zinc in the present invention is that it is completely oxidized to the oxide form which does not form a contaminant in the various applications mentioned herein. Zinc oxide is in fact a fine refractory, having a refractory temperature of only about 50 C less than $Al_2O_3$. Additionally, zinc oxide has a higher melting point than $SiO_2$.

These and other features of the invention will be better understood from the following detailed description.

DETAILED DESCRIPTION OF THE INVENTION

The best modes of practicing the present invention is illustrated and described in the following specific examples.

EXAMPLE I

In a coke oven lined with silica bricks, the damaged areas which included both cracks and spalls were repaired in situ by flame spraying according to the invention material which contained 82% of crushed silica brick −12×D USS mesh as the incombustible refractory portion and 17.25% of silicon metal powder, 0.5% of magnesium metal powder and 0.25% of zinc metal powder, all −325×D USS mesh.

The material was mixed with oxygen and formed a solid refractory repair mass fuzed to the refractories being repaired.

EXAMPLE II

Coke oven walls as in Example I were repaired with the following recipe which resulted in a good repair mass:

| | Particle Grading (USS Mesh) | % by Weight of Total |
|---|---|---|
| silica refractory grain | −12 × D | 80.75% |
| silicon powder | −325 × D | 18% |
| zinc powder | −325 × D | 1% |
| magnesium powder | −325 × D | .25% |

EXAMPLE III

Coke oven walls as in Example I were repaired using the following mixture:

| | | |
|---|---|---|
| silica refractory grain | −25 + 50 | 43% |
| silica refractory grain | −50 + 100 | 40% |
| silicon powder | −325 × D | 16% |
| zinc powder | −325 × D | 1% |

EXAMPLE IV

The process of Example I was repeated using the following mixture:

| | | |
|---|---|---|
| silica brick crushed | −12 × D | 87% |
| silicon powder | −325 × D | 12% |
| magnesium powder | −325 × D | 1% |

EXAMPLE V

In a silicon carbide column used for the distillation of zinc metals and zinc oxides, the silicon carbide trays which form the column were repaired, sealing leaks through molten zinc metal and/or zinc oxide could escape. A mixture of silicon carbide grains of grading −20×D USS mesh comprising 76% of the total mixture together with silicon metal particles of grading −325 USS mesh comprising 20% of the total mixture together with zinc metal powder graded −325×D USS mesh comprising 2% of the total mixture together with magnesium metal powder graded −200×D USS mesh comprising 2% of the total mixture was used to form a coherent, adherent mix to seal the leaks.

EXAMPLE VI

A column as in Example V was repaired with a mixture comprising:

| | | |
|---|---|---|
| silicon carbide particles | −100 × D USS | 76% |
| silicon metal powder | −325 × D USS | 20% |
| zinc metal powder | −325 × D USS | 2% |
| magnesium metal powder | −200 × D USS | 2% |

EXAMPLE VII

A column as in Example V was repaired with a mixture comprising:

| | | |
|---|---|---|
| silicon carbide particles | −50 + 100 | 76% |
| silicon metal particles | −325 × D USS | 20% |
| zinc metal particles | −325 × D USS | 2% |
| magnesium metal particles | −200 × D USS | 2% |

Variations and modifications of the invention will be apparent to those skilled in the art from the above detailed description. Therefore, it is to be understood that, within the scope of the appended claims, the invention can be practiced otherwise than as specifically shown and described.

I claim:

1. A composition for flame spraying refractory linings in situ comprising a mixture of oxidizable metallic particles and in combustible refractory particles wherein the metallic particles are silicon, zinc and magnesium, wherein the zinc and magnesium have a particle grain size of 74 microns or less, wherein the zinc and magnesium are present in an amount up to about 6% by weight of the total mixture and each being present in an amount of at least 0.025% by weight of the total mixture wherein the silicon is present in an amount of between about 8% and about 25% by weight for the total mixture, and wherein the incombustible refractory particles are silicon carbide or at least one selected from the group consisting of silica, alumina, magnesite, chromia, zirconic, and mixtures thereof.

2. The composition of claim 1 wherein the oxidizable particles have a grain size of 60 microns or less.

3. The composition of claim 2 wherein the oxidizable particles have a grain size of 20 microns or less.

4. The composition of claim 2 wherein the incombustible refractory particles silica, alumina, magnesite, chromia, zirconia and mixtures thereof and wherein the zinc is present in an amount from about 0.25% to about 3% by weight.

5. The composition of claim 1 wherein the incombustible refractory particles are selected from the group consisting of silica, alumina, magnesite, chromia and zirconia, and mixtures thereof wherein the magnesium is present in an amount from about 0.25% to about 2% by weight.

6. The composition of claim 1 wherein the incombustible refractory particles are selected from the group consisting of silica, alumina, magnesite, chromia and zirconia, and mixtures thereof and wherein the zinc is present in an amount from about 0.25% to about 3% by weight, wherein the magnesium is present in an amount from about 0.25% to about 2% by weight, and wherein the silicon is present in an amount from about 12% to about 25% weight.

7. The composition of claim 6 wherein the zinc is present in an amount from about 0.25% to about 1% by weight, wherein the magnesium is present in an amount from about 0.25% to about 0.5% by weight, and wherein the silicon is present in an amount of at least 12% by weight.

8. The composition of claim 1 wherein the incombustible refractory particles comprise silicon carbide and wherein the zinc is present in an amount from about 1% to about 3% by weight, wherein the magnesium is present in an amount from about 1% to about 3% by weight, and wherein the silicon is present in an amount of at least 14% by weight.

9. The composition of claim 8 wherein the zinc is present in an amount of about 2% by weight, wherein the magnesium is present in an amount of about 2% by weight, and wherein the silicon is present in an amount at least 20% by weight.

10. A composition for flame spraying refractory linings in situ comprising a mixture of oxidizable metallic particles and incombustible refractory particles, wherein the refractory particles are selected from the group consisting of silica, alumina, magnesite, chromia, zirconia, and mixtures thereof wherein the metallic oxidizable particles are silicon, zinc and magnesium, wherein the silicon is present in an amount of from about 12% to about 25% by weight and wherein zinc and magnesium are of the total mixture, and each being present in amount, of at least 0.25% by weight of the total mixture present in an amount up to about 5% by weight.

* * * * *

UNITED STATES PATENT AND TRADEMARK OFFICE
CERTIFICATE OF CORRECTION

PATENT NO. : 4,946,806

DATED : August 7, 1990

INVENTOR(S) : David C. Willard

It is certified that error appears in the above-identified patent and that said Letters Patent is hereby corrected as shown below:

Column 1, line 48 delete "3,741,822" and insert --2,741,822--.

Column 1, line 63, delete "4,488,022" and insert --4,489,022--.

Column 2, line 8, delete "are" and insert --is--.

Column 2, line 50, delete "X" and insert --x--.

Column 2, line 58, delete "X" and insert --x--.

Column 2, line 60, delete "X" and insert --x--.

Column 2, line 63 delete the second " %" and insert --1%--.

Column 3, line 24, delete "X" and insert --x--.

Column 4, line 16, delete "50" and insert --50°--.

In Example 1

Column 4, line 34, delete "X" and insert --x--.

Column 4, line 37, delete "X" and insert --x--.

In Example V

Column 5, line 13, delete "X" and insert --x--.

Column 5, line 16, delete "X" and insert --x--.

Column 5, line 19, delete "X" and insert --x--.

UNITED STATES PATENT AND TRADEMARK OFFICE

CERTIFICATE OF CORRECTION

PATENT NO. : 4,946,806
DATED : August 7, 1990
INVENTOR(S) : David C. Willard

It is certified that error appears in the above-identified patent and that said Letters Patent is hereby corrected as shown below:

<u>In Claim 1</u>

Column 5, line 52, delete "in combustible" and insert --incombustible--.

Column 5, line 57, delete "0.025%" and insert --0.25%--.

Column 5, line 59, delete "for" and insert --of--.

<u>In Claim 10</u>

Column 6, line 56, after "are" insert --present--.

Signed and Sealed this

Twenty-ninth Day of September, 1992

*Attest:*

DOUGLAS B. COMER

*Attesting Officer* *Acting Commissioner of Patents and Trademarks*